US009596386B2

(12) United States Patent
Polak et al.

(10) Patent No.: US 9,596,386 B2
(45) Date of Patent: Mar. 14, 2017

(54) MEDIA SYNCHRONIZATION

(71) Applicant: Oladas, Inc., Riverside, CT (US)

(72) Inventors: Adam Polak, Riverside, CT (US); Raymond Migneco, Philadelphia, PA (US); Olenka Polak, Riverside, CT (US)

(73) Assignee: Oladas, Inc., Riverside, CT (US)

( * ) Notice: Subject to any disclaimer, the term of this patent is extended or adjusted under 35 U.S.C. 154(b) by 279 days.

(21) Appl. No.: 13/949,731

(22) Filed: Jul. 24, 2013

(65) Prior Publication Data

US 2014/0028914 A1 Jan. 30, 2014

Related U.S. Application Data

(60) Provisional application No. 61/675,219, filed on Jul. 24, 2012, provisional application No. 61/784,532, filed on Mar. 14, 2013.

(51) Int. Cl.

| *G06F 15/16* | (2006.01) |
|---|---|
| *H04N 5/04* | (2006.01) |
| *H04N 21/414* | (2011.01) |
| *H04N 21/43* | (2011.01) |
| *H04N 21/439* | (2011.01) |
| *H04N 21/485* | (2011.01) |
| *H04N 21/8352* | (2011.01) |

(52) U.S. Cl.
CPC ......... *H04N 5/04* (2013.01); *H04N 21/41415* (2013.01); *H04N 21/4307* (2013.01); *H04N 21/4394* (2013.01); *H04N 21/4856* (2013.01); *H04N 21/8352* (2013.01)

(58) Field of Classification Search
CPC .......................... G06F 17/30; G06F 17/30861
See application file for complete search history.

(56) References Cited

U.S. PATENT DOCUMENTS

| 2,092,931 A | 9/1937 | Regan et al. |
|---|---|---|
| 2,230,949 A | 2/1941 | Heller et al. |

(Continued)

FOREIGN PATENT DOCUMENTS

| BE | 1018008 A6 | 3/2010 |
|---|---|---|
| GB | 1238793 A | 7/1971 |

(Continued)

OTHER PUBLICATIONS

Oostveen, J., et al., "Feature Exctraction and a Database Strategy for Video Fingerprinting" , Mar. 2002, Springer, 5th International conference, p. 117-128.*

(Continued)

*Primary Examiner* — Brian Whipple
*Assistant Examiner* — Anthony Rotolo
(74) *Attorney, Agent, or Firm* — Wilmer Cutler Pickering Hale and Dorr LLP

(57) ABSTRACT

Systems and methods are described for synchronizing media data. A method of synchronizing media data includes receiving a reference acoustic fingerprint for a first media data, generating at least one acoustic fingerprint fragment from a portion of the first media data, comparing the at least one acoustic fingerprint fragment against the reference acoustic fingerprint and identifying a match, and synchronizing a second media data with the first media data based on the match.

31 Claims, 8 Drawing Sheets

(56) References Cited

U.S. PATENT DOCUMENTS

| | | |
|---|---|---|
| 3,196,454 A | 7/1965 | Robert |
| 3,238,293 A | 3/1966 | George |
| 3,743,391 A | 7/1973 | White |
| 4,067,049 A | 1/1978 | Kelly et al. |
| 4,591,928 A | 5/1986 | Bloom et al. |
| 5,040,081 A | 8/1991 | McCutchen |
| 5,481,296 A | 1/1996 | Cragun et al. |
| 5,493,414 A | 2/1996 | Inoue et al. |
| 5,625,570 A | 4/1997 | Vizireanu et al. |
| 5,880,788 A | 3/1999 | Bregler |
| 6,345,143 B2 | 2/2002 | Kanda |
| 6,661,496 B2 | 12/2003 | Sherman et al. |
| 6,744,487 B2 | 6/2004 | Mason |
| 6,778,252 B2 | 8/2004 | Moulton et al. |
| 7,055,166 B1 | 5/2006 | Logan et al. |
| 7,283,954 B2 | 10/2007 | Crockett et al. |
| 7,343,082 B2 | 3/2008 | Cote et al. |
| 7,444,061 B2 | 10/2008 | Naitoh |
| 7,519,276 B2 | 4/2009 | Kim et al. |
| 7,627,808 B2 | 12/2009 | Blank et al. |
| 7,747,215 B2 | 6/2010 | Choi |
| 7,787,750 B2 | 8/2010 | Kondo et al. |
| 8,009,966 B2 | 8/2011 | Bloom et al. |
| 8,170,878 B2 | 5/2012 | Liu et al. |
| 8,179,475 B2 | 5/2012 | Sandrew |
| 8,249,414 B2 | 8/2012 | Ackley et al. |
| 8,270,816 B2 | 9/2012 | Mizushima et al. |
| 8,295,957 B2 | 10/2012 | Holzberg et al. |
| 8,503,862 B2 | 8/2013 | Hsieh et al. |
| 8,529,264 B2 | 9/2013 | Hamlin |
| 8,572,488 B2 | 10/2013 | Phillips et al. |
| 8,634,030 B2 | 1/2014 | Hale et al. |
| 2002/0120925 A1 | 8/2002 | Logan |
| 2002/0161579 A1 | 10/2002 | Saindon et al. |
| 2002/0193895 A1 | 12/2002 | Qian et al. |
| 2003/0093790 A1 | 5/2003 | Logan et al. |
| 2004/0234250 A1 | 11/2004 | Cote et al. |
| 2005/0042591 A1 | 2/2005 | Bloom et al. |
| 2005/0228663 A1 | 10/2005 | Boman et al. |
| 2005/0257242 A1 | 11/2005 | Montgomery et al. |
| 2006/0078288 A1 | 4/2006 | Huang et al. |
| 2006/0155399 A1 | 7/2006 | Ward |
| 2006/0285654 A1 | 12/2006 | Nesvadba et al. |
| 2007/0196795 A1 | 8/2007 | Groff |
| 2007/0274685 A1 | 11/2007 | Hale et al. |
| 2007/0299983 A1* | 12/2007 | Brothers .................. 709/231 |
| 2008/0066136 A1 | 3/2008 | Dorai et al. |
| 2008/0085100 A1 | 4/2008 | Matono et al. |
| 2008/0092047 A1 | 4/2008 | Fealkoff et al. |
| 2008/0092168 A1 | 4/2008 | Logan et al. |
| 2008/0190271 A1* | 8/2008 | Taub et al. .................. 84/645 |
| 2008/0195386 A1 | 8/2008 | Proidl et al. |
| 2008/0263360 A1* | 10/2008 | Haitsma ............ G06F 17/30787 713/180 |
| 2010/0129049 A1 | 5/2010 | Hasegawa |
| 2011/0041154 A1 | 2/2011 | Olson |
| 2011/0222833 A1 | 9/2011 | Johnston et al. |
| 2012/0041759 A1 | 2/2012 | Barker et al. |
| 2012/0317240 A1* | 12/2012 | Wang ....................... 709/219 |

FOREIGN PATENT DOCUMENTS

| | | |
|---|---|---|
| GB | 2101795 A | 1/1983 |
| JP | H02250047 A | 10/1990 |
| JP | H086182 A | 1/1996 |
| JP | 2005260562 A | 9/2005 |
| JP | 2006196091 A | 7/2006 |
| JP | 2007200402 A | 8/2007 |
| JP | 2007280470 A | 10/2007 |
| JP | 2011060390 A | 3/2011 |
| WO | WO-9715926 A1 | 5/1997 |
| WO | WO-0223896 A1 | 3/2002 |
| WO | WO-02097791 A1 | 12/2002 |
| WO | WO-2007004110 A2 | 1/2007 |

OTHER PUBLICATIONS

International Search Report and Written Opinion for App. No. PCT/US2013/051853, dated Feb. 10, 2014, 11 pages.

* cited by examiner

MEDIA SYNCHRONIZATION

RELATED APPLICATIONS

This application claims priority to U.S. Provisional Patent Application Nos. 61/675,219 filed on Jul. 24, 2012 and 61/784,532 filed on Mar. 14, 2013, the contents of which are incorporated herein by reference in their entireties.

BACKGROUND

Field of the Invention

This invention generally relates to an media synchronizing system and, more particularly, to systems and methods of synchronizing active media data with reference media data played on a mobile device.

Description of the Prior Art

Audiovisual media (e.g., a movie film played in a theater) can contain multiple formats (e.g., audio and video) from different sources. For example, audio tracks of a movie film can be taken off of the film reels and put onto a separate medium (e.g., CD) in order to enhance sound quality. Films projected onto a movie screen can then be synchronized with the audio tracks when the movie film is played in the theater. The sound tracks including the dialog in a movie film can be translated into multiple languages (e.g., Spanish, French, etc.). Thus, the audio of a movie can be dubbed in multiple languages. When a user goes to see a movie in the theater, the user sometimes prefers to hear the audio in a language different from the language in which the movie is being played in the movie theater. But, the user is limited to the languages that are provided by the movie theatre. A need exists to provide a user a way to select the language in which an audio file is dubbed.

SUMMARY OF INVENTION

In accordance with the disclosed subject matter, systems and methods are described for synchronizing media data.

Disclosed subject matter includes, in one aspect, a method of synchronizing media data, which includes receiving a reference acoustic fingerprint for a first media data, generating at least one acoustic fingerprint fragment from a portion of the first media data, comparing the at least one acoustic fingerprint fragment against the reference acoustic fingerprint and identifying a match, and synchronizing a second media data with the first media data based on the match.

In some embodiments, the method further includes receiving the second media data from a remote source.

In some embodiments, the reference acoustic fingerprint is embedded within the second media data.

In some embodiments, the method further includes verifying security access to the second media data.

In some embodiments, the method further includes decrypting the second media data.

In some embodiments, the second media data contains audio and video information.

In some embodiments, the method further includes generating the at least one fingerprint fragment from one of a plurality of frequency bands of the portion of the first media data.

In some embodiments, the method further includes generating at least one hash from one of a plurality of frequency bands of the portion of the first media data.

In some embodiments, the identifying step comprises locating a timestamp corresponding to the reference acoustic fingerprint.

In some embodiments, the synchronizing step comprises triggering the second media data based on the timestamp.

In some embodiments, the synchronizing step comprises calculating a synchronization processing delay.

In some embodiments, the synchronizing step comprises compensating a synchronization processing delay.

In some embodiments, the method further includes detecting a time drift between the first and second media data.

In some embodiments, the method further includes re-synchronizing the second media data with the first media data automatically.

In some embodiments, the re-synchronizing step comprises adjusting a playback position of the second media data.

In some embodiments, the re-synchronizing step comprises adjusting a playback speed of the second media data.

Disclosed subject matter includes, in another aspect, a method of synchronizing media data, which includes capturing a portion of a first media data, generating at least one acoustic fingerprint fragment from the portion of the first media data, receiving a second media data, wherein a reference acoustic fingerprint for the first media data is embedded within the second media data, comparing the at least one acoustic fingerprint fragment against the reference acoustic fingerprint and identifying a timestamp corresponding to the reference acoustic fingerprint, triggering the second media data based on the timestamp to synchronize the second media data with the first media data, and re-synchronizing the second media data with the first media data automatically.

In some embodiments, the method further includes receiving the second media data from a remote resource.

In some embodiments, the re-synchronizing step comprises adjusting a playback position of the second media data.

In some embodiments, the re-synchronizing step comprises adjusting a playback speed of the second media data.

Disclosed subject matter includes, in yet another aspect, a system for synchronizing media data, which includes a reference fingerprint manager configured to receive a reference acoustic fingerprint for a first media data, a fingerprint calculator configured to generate at least one acoustic fingerprint fragment from a portion of the first media data, a fingerprint matcher configured to compare the at least one acoustic fingerprint fragment against the reference acoustic fingerprint and identify a match, and an active media manager configured to receive a second media data and synchronize the second media data with the first media data based on the match.

In some embodiments, the system further includes a data access manager configured to manage security access to the second media data.

In some embodiments, the system further includes a configuration manager configured to customize the system for synchronizing media data.

In some embodiments, the system further includes a network interface configured to communicate with a remote source and download the second media data from the remote source.

In some embodiments, the system further includes a host interface configured to interact with a host device to receive the portion of the first media data.

In some embodiments, the fingerprint matcher is further configured to locate a timestamp corresponding to the reference acoustic fingerprint.

In some embodiments, the active media manager is further configured to trigger the second media data based on the timestamp.

In some embodiments, the system further includes a re-synchronizer configured to re-synchronize the second media data with the first media data automatically.

In some embodiments, the re-synchronizer is further configured to adjust a playback position of the second media data.

In some embodiments, the re-synchronizer is further configured to adjust a playback speed of the second media data.

DETAILED DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain undisclosed features are well known in the art. In addition, it will be understood that the examples provided below are only examples, and that it is contemplated that there are other systems and methods that are within the scope of the disclosed subject matter.

Embodiments of the disclosed subject matter provide techniques for an audio synchronizing system. One embodiment of the audio synchronizing system can be implemented to provide an audio file rental service on mobile devices (e.g., smartphones or tablets). For example, a user can access dubbed audio files via a mobile application for movies that are being shown in theaters. The mobile application can provide a service that rents an audio file in the language of the user's choosing for a corresponding movie the user is planning on attending in a movie theater. The mobile application can download the rented audio file (e.g., the dubbed audio in a foreign language) onto the mobile device ahead of time or on demand. The mobile application can synchronize the downloaded audio file with the movie being played in the movie theater via "tagging." Tagging synchronizes the downloaded audio file (e.g., the audio of the movie in another language) with the movie being played in the movie theater. Once tagging is successful, the user can hear the downloaded audio file (e.g., dubbed in a different language) from the mobile device while watching the movie being played in the theater. In this example, the mobile application can trigger/start/launch the playing of specific audio files at specific locations in response to an external audio signal (e.g., sound picked up by the microphone of a mobile device inside a movie theater). Other embodiments are within the scope of the invention.

Figure 1:
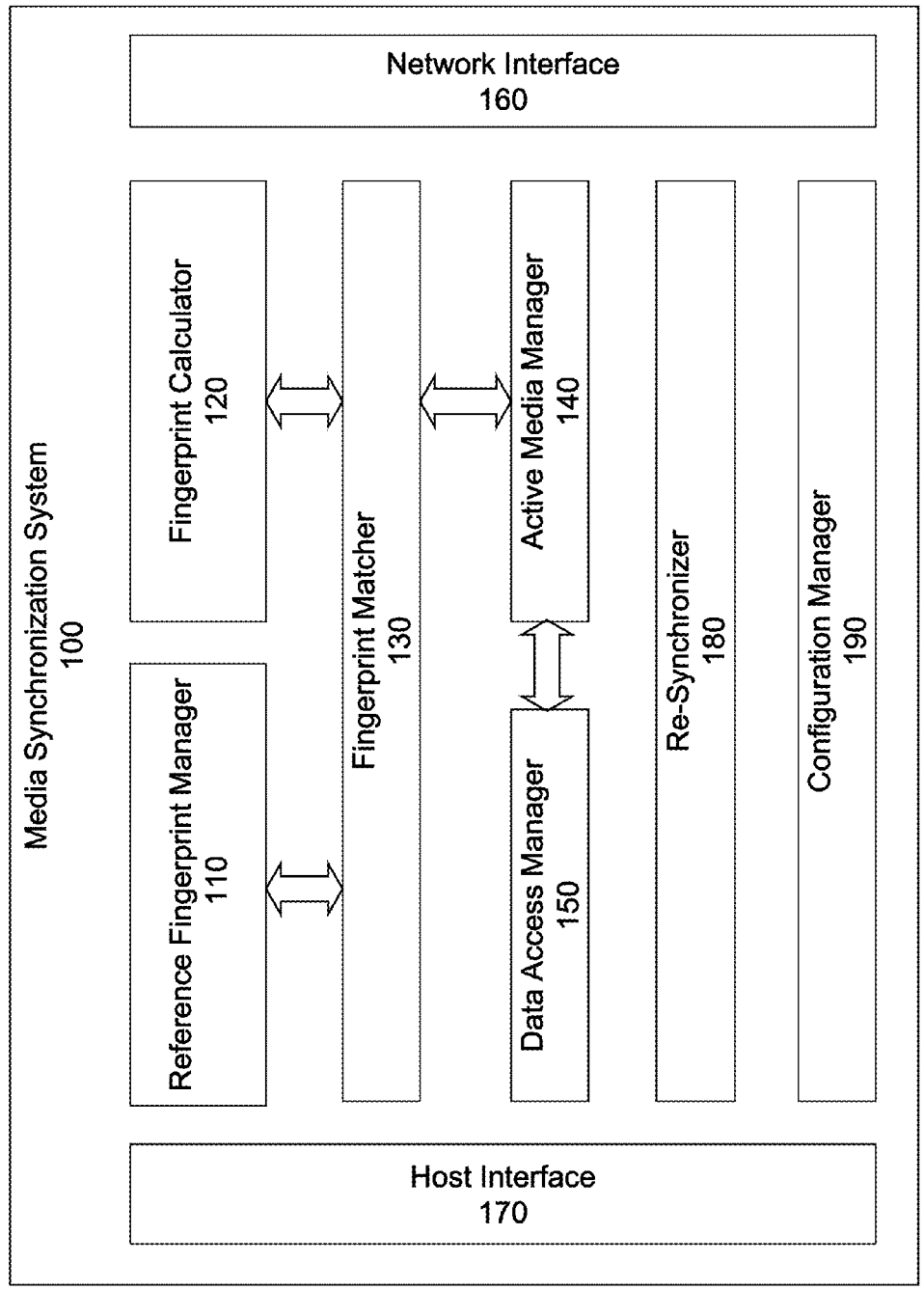
FIG. 1 illustrates a block diagram of an exemplary media synchronization system.

FIG. 1 illustrates a block diagram of an exemplary media synchronization system 100 according to certain embodiments of the disclosed subject matter. The media synchronization system 100 can include a reference fingerprint manager 110, a fingerprint calculator 120, a fingerprint matcher 130, an active media manager 140, a data access manager 150, a network interface 160, a host interface 170, a re-synchronizer 180, and a configuration manager 190. The media synchronization system 100 can synchronize two or more media data (e.g., a first media data and a second media data). The media synchronization system 100 can include additional modules, fewer modules, or any other suitable combination of modules that perform any suitable operation or combination of operations.

The reference fingerprint manager 110 can receive a reference acoustic fingerprint for a media data (e.g., a first media data). In some embodiments, the reference fingerprint manager 110 can store and manage one or more reference acoustic fingerprints for one or more media data within the media synchronization system 100. More details about reference acoustic fingerprints can be found in later sections of this document, including FIGS. 2 and 3 and their corresponding descriptions. In some embodiments, the reference fingerprint manager 110 can be implemented in a dedicated or shared hardware device, for example, a general purpose processor (e.g., CPU) or a special purpose processor (e.g., accelerator). In some embodiments, the reference fingerprint manager 110 can be implemented in software or firmware (e.g., computer executable instructions) only, running on a hardware device (e.g., a processor). In some embodiments, the reference fingerprint manager 110 can be implemented as a combination of hardware and software.

The fingerprint calculator 120 can generate acoustic fingerprint fragment(s). In some embodiments, one or more acoustic fingerprint fragments can be generated. The one or more acoustic fingerprint fragments can be generated from a portion or the entirety of the first media data. In some embodiments, the fingerprint calculator 120 can generate at least one fingerprint fragment from one or more frequency bands of the first media data. Optionally, the fingerprint calculator 120 can generate at least one hash from one of the frequency bands. More details about acoustic fingerprints and fingerprint fragments can be found in later sections of this document, including FIGS. 2 and 3 and their corresponding descriptions. In some embodiments, the fingerprint calculator 120 can be implemented in a dedicated or shared hardware device, for example, a general purpose processor (e.g., CPU) or a special purpose processor (e.g., accelerator). In some embodiments, the fingerprint calculator 120 can be implemented in software or firmware (e.g., computer executable instructions) only, running on a hardware device (e.g., a processor). In some embodiments, the fingerprint calculator 120 can be implemented as a combination of hardware and software.

The fingerprint matcher 130 can compare the one or more fingerprint fragments against the reference acoustic fingerprint. In some embodiments, the fingerprint matcher 130 can compare one or more fingerprint fragments generated by the fingerprint calculator 120 with a reference acoustic fingerprint received from the reference fingerprint manager 110, and identify a match based on the comparison. In some embodiments, the reference acoustic fingerprint can cover a certain timespan (e.g., 2 hours) and can contain a plurality of timestamps (e.g., 00:00:00.00, 01:00:00.00, etc.) within the timespan. The fingerprint matcher 130 can locate a timestamp corresponding to the reference acoustic fingerprint. In some embodiments, a timestamp can be located by matching a fingerprint fragment with certain portion of the reference acoustic fingerprint. More details about fingerprint matching can be found in later sections of this document, including FIGS. 3 and 4 and their corresponding descriptions. In some embodiments, the fingerprint matcher 130 can be implemented in a dedicated or shared hardware device, for example, a general purpose processor (e.g., CPU) or a special purpose processor (e.g., accelerator). In some embodiments, the fingerprint matcher 130 can be implemented in software or firmware (e.g., computer executable instructions) only, running on a hardware device (e.g., a processor). In some embodiments, the fingerprint matcher 130 can be implemented as a combination of hardware and software.

The active media manager 140 can receive another media data (e.g., a second media data) and synchronize the second media data with the first media data. In some embodiments, synchronization can be based on the match (e.g., a timestamp) identified by the fingerprint matcher 130. In some embodiments, the active media manager 140 can trigger the second media data based on the timestamp. Optionally, the active media manager 140 can calculate and compensate a synchronization processing delay to improve synchronization accuracy. More details about synchronization can be found in later sections of this document, including FIG. 4 and their corresponding descriptions. In some embodiments, the active media manager 140 can be implemented in a dedicated or shared hardware device, for example, a general purpose processor (e.g., CPU) or a special purpose processor (e.g., accelerator). In some embodiments, the active media manager 140 can be implemented in software or firmware (e.g., computer executable instructions) only, running on a hardware device (e.g., a processor). In some embodiments, the active media manager 140 can be implemented as a combination of hardware and software.

The data access manager 150 can manage security access to the second media data (e.g., stored and managed by the active media manager 140). In some embodiments, the data access manager 150 can check a security credential associated with the second media data. The data access manager 150 can authenticate the second media data and verify that the media synchronization system 100 has the proper authorization and permission to access or use the second media data. In some embodiments, the data access manager 150 can encrypt and/or decrypt the second media data. Symmetric encryption algorithm (e.g., AES) and/or asymmetric encryption algorithms (e.g., public/private key cryptography) can be used to encrypt/decrypt the second media data. In some embodiments, the data access manager 150 can be implemented in a dedicated or shared hardware device, for example, a general purpose processor (e.g., CPU) or a special purpose processor (e.g., accelerator). In some embodiments, the data access manager 150 can be implemented in software or firmware (e.g., computer executable instructions) only, running on a hardware device (e.g., a processor). In some embodiments, the data access manager 150 can be implemented as a combination of hardware and software.

The network interface 160 can support communication with remote devices and/or services. In some embodiments, the network interface 160 can communicate with a remote source to receive media data (e.g., the second media data) from the remote source. The received media data can be stored and managed by the active media manager 140. In some embodiments, a reference acoustic fingerprint for the first media data can be embedded within the second media data. The network interface 160 can be implemented in hardware, software, or a combination of both. The network interface 160 can connect to various wired or wireless networks, including the Internet, a cellular network, a telephone network, a computer network, a packet switching network, a line switching network, a local area network (LAN), a wide area network (WAN), a global area network, or any number of private networks currently referred to as an Intranet, and/or any other network or combination of networks that can accommodate data communication. Such networks may be implemented with any number of hardware and software components, transmission media and network protocols.

The host interface 170 can support communication with a hosting device. A hosting device can be any computing device that hosts the media synchronization system 100 and provide services. In some embodiments, a hosting device can be a mobile device (e.g., a smartphone) and the host interface 160 can allow the media synchronization system 100 to access certain functions/features of the mobile device (e.g., microphone, speaker, processors, memory, storage, etc.). An embodiment of a hosting device is described with respect to FIG. 8, below. For example, the host interface 160 can allow the media synchronization system 100 to access a microphone of a hosting device and capture a portion of the first media data. The host interface 170 can be implemented in hardware, software, or a combination of both.

The re-synchronizer 180 can re-synchronize the second media data with the first media data. In some embodiments, the re-synchronizer 180 can detect a time drift between the first and second media data. In some embodiments, the re-synchronizer 180 can initiate re-synchronization on demand or manually (e.g., by a user). In some embodiments, the re-synchronizer 180 can initiate re-synchronization automatically. In one example, the re-synchronizer 180 can initiate re-synchronization periodically (e.g., every minute). In another example, the re-synchronizer 180 can initiate re-synchronization when a certain threshold is met (e.g., when the time drift exceeds 200 ms). In the previous two examples, re-synchronization can be initiated without user intervention or even knowledge. A re-synchronization process can be similar to the initial synchronization process. In some embodiments, the re-synchronizer 180 can adjust a playback position and/or speed of the second media data. More details about re-synchronization can be found in later sections of this document, including FIGS. 6 and 7 and their corresponding descriptions. In some embodiments, the re-synchronizer 180 can be implemented in a dedicated or shared hardware device, for example, a general purpose processor (e.g., CPU) or a special purpose processor (e.g., accelerator). In some embodiments, the re-synchronizer 180 can be implemented in software or firmware (e.g., computer executable instructions) only, running on a hardware device (e.g., a processor). In some embodiments, the re-synchronizer 180 can be implemented as a combination of hardware and software.

The configuration manager 190 can customize the media synchronization system 100. Configuration can be determined by a hosting device or a user of the media synchronization system 100. For example, the configuration manager 190 can customize how the fingerprint matcher 130 identifies a match, the degree of certainty for identifying a match, how the data access manager 150 manages the security access to media data, what remote source the network interface 160 communicates with to download media data, how/when re-synchronization is initiated (e.g., periodically, on demand, or by certain thresholds), how re-synchronization is performed (e.g., playback position adjustment and/or speed adjustment). In some embodiments, the configuration manager 190 can be implemented in a dedicated or shared hardware device, for example, a general purpose processor (e.g., CPU) or a special purpose processor (e.g., accelerator). In some embodiments, the configuration manager 190 can be implemented in software or firmware (e.g., computer executable instructions) only, running on a hardware device (e.g., a processor). In some embodiments, the configuration manager 190 can be implemented as a combination of hardware and software.

An audio file has a unique "acoustic fingerprint," which can be generated from a number of variables (e.g., amplitude, duration, frequency, and pitch, etc.) based on an acoustic fingerprinting algorithm. The acoustic fingerprint of an audio file can serve as a condensed summary of the audio file's characteristics. This summary, or "acoustic fingerprint," can be compared to a database of acoustic fingerprints in order to identify a matching audio file. In one example, a mobile application can sample a piece of audio data received at a microphone of the mobile device, analyze the sampled audio data and create an acoustic fingerprint fragment. The application can then scan through a collection of available acoustic fingerprints of entire audio files (e.g., songs) to locate an acoustic fingerprint which contains the fingerprint fragment. The application can then display information about the audio file(s) associated with the located acoustic fingerprint. When the speed of analysis is not critical, the mobile application can record the sample audio data (either partially or fully) and then analyze it later. When the speed of analysis is critical, the process of recording, analyzing, and matching can occur simultaneously in real-time. An acoustic fingerprint of an audio file can be much smaller in terms of data size than the audio file itself. The small data size of acoustic fingerprints can allow for quicker loading and analysis.

Figure 2:
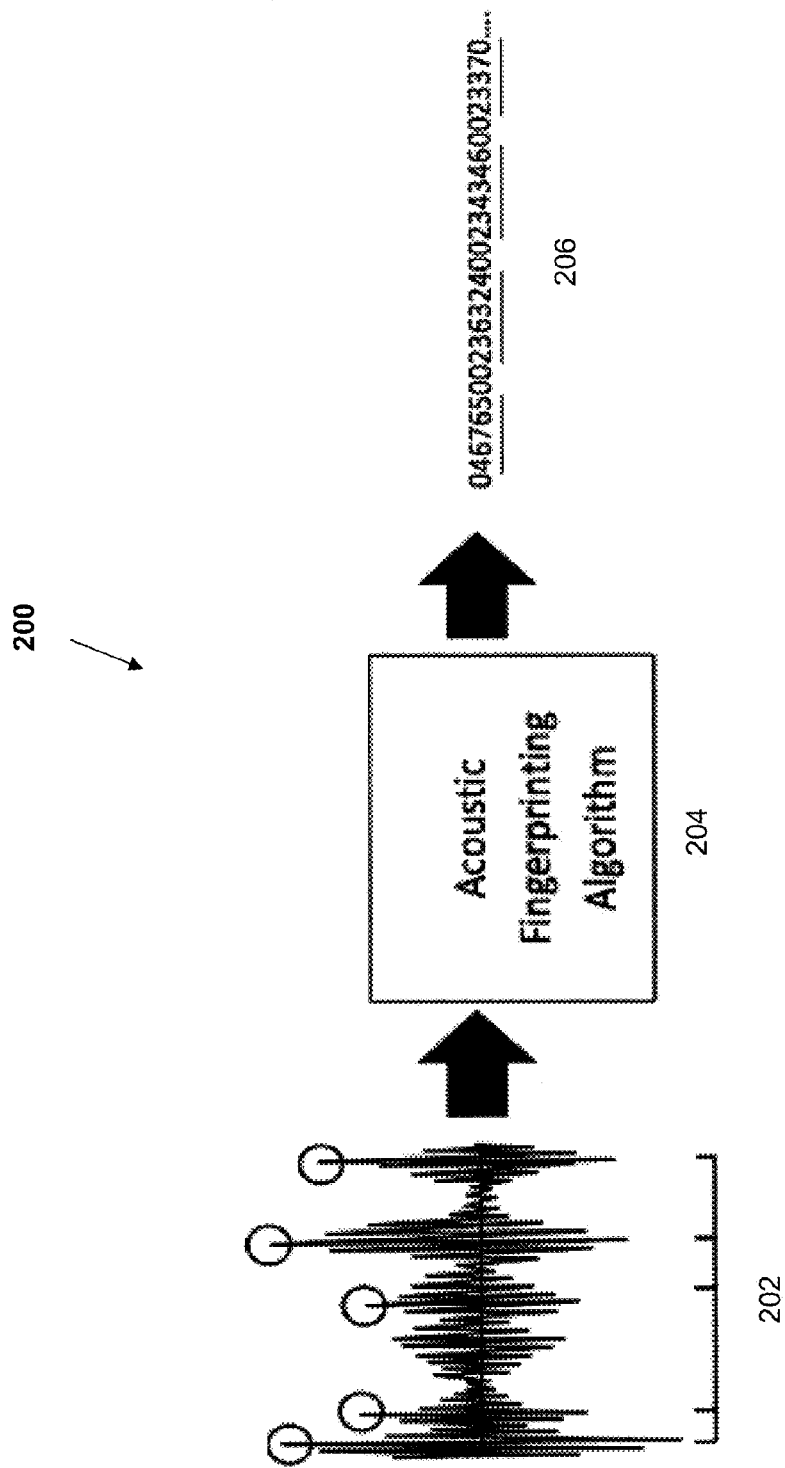
FIG. 2 illustrates an exemplary process of generating an acoustic fingerprint of an audio file according to an embodiment of the disclosed subject matter.

FIG. 2 demonstrates an exemplary process 200 of generating an acoustic fingerprint of an audio file using an acoustic fingerprinting algorithm according to an embodiment of the disclosed subject matter. As illustrated in FIG. 2, an input audio file 202 can contain individual audio fragments that have "characters," which are marked with circles on the audio waveform. These characters can be based on acoustic events. The input audio file 202 can be fed into an acoustic fingerprinting algorithm 204 to generate an acoustic fingerprint 206 of the input audio file 202. The acoustic fingerprint can be represented as a series of numeric digits. In one example, '0' is used as a separator between discrete fragments of the acoustic fingerprint 206; the numbers between these separators can be generated by the fingerprinting algorithm based on certain properties of the input audio file 202 (e.g., time and amplitude). The same acoustic fingerprinting algorithm can be used to analyze recorded audio samples and downloaded audio files.

Audio fingerprinting technology can be used to recognize specific audio recordings, even in low-quality transmission/capture situations, such as those that might be encountered when a smartphone is recording ambient sound that includes playback of the track. In one embodiment, the acoustic fingerprinting algorithm 204 operates by finding successive "events" in selected frequency bands. For example, a smartphone records audio, which is then broken into eight frequency bands spanning 0 Hz to 5512 Hz, and in each band an energy envelope is extracted and an onset detector applied, generating a series of onset times (i.e., times at which the energy in that band suddenly increases above its recent average level). The onset detector adapts its decay rate to preserve an average of around one onset per second per band. In this example algorithm, the acoustic fingerprinting algorithm 204 processes each band separately so that as long as at least one of the bands is "clear" at any time it can still identify a match, as noise and distortion tend to be localized by frequency and do not interfere with the operation of the acoustic fingerprinting algorithm 204. In some embodiments, an acoustic fingerprinting algorithm (e.g., 204 in FIG. 2) can be implemented in hardware and/or software on a fingerprint calculator (e.g., 120 in FIG. 1) and/or other modules of a media synchronization system (e.g., 100 in FIG. 1).

In this example algorithm, sequences of five successive onsets in a single band (derived from about five seconds of audio) is converted into a number of hashes. One purpose of hashing is to take information about the onsets in a particular frequency band and map it to a simpler number. In some instances, it can be considered a quantization task. Hashing to a simpler number accelerates database look-up during the matching phase. A fingerprint code is generated by hashing the time difference between pairs of onsets and the frequency band containing those onsets. The hashing function generates 12 bits of quantization for the time difference between onsets and 3 bits for quantizing the frequency band. The time differences are quantized into units of 11.6 ms, generating around 7 bits of information for each time difference, and combined with the 3-bit band index to create a hash with around $2^{17}=128$ k distinct values. In accordance with this example algorithm, a reference track generates around 48 hashes per second of audio (e.g., 8 bands×1 onset/band/sec×6 hashes/onset). Each hash is stored in an index, so for each of the $2^{17}$ distinct hashes, there is a list of which tracks contained that hash, and at what time offset(s) within that track the particular hash occurred.

Hashes can be produced in a similar manner when recognizing noisy queries. In general, many of these hashes can be different from those generated when analyzing the reference track, as the limited fidelity of playback and recording and the presence of extraneous noise may cause the onset detector to find different sets of onsets. However, at least some of the time in at least some of the frequency bands, there can be some subsets of three onsets which match three onsets extracted from the reference track, and so the time differences, and hence the hashes, can match. The acoustic fingerprinting algorithm 204 can take all the hashes extracted from the query and reference them against an index to generate a list of all the reference tracks in which at least some of those hashes occurred. Then, the acoustic fingerprinting algorithm 204 can sort that list by the frequency of occurrence of each reference track. Generally there may be only a small number of tracks that share more than a few hashes with the query, including the true match.

To further eliminate chance, or incorrect, matches, the acoustic fingerprinting algorithm 204 can then calculate the skew between times at which each matching hash occurred in the query (which can be relative to some arbitrary starting point), and the times at which those same hashes occurred in each matching reference item. When the reference is the true match, most of the time skews give a single value (the time difference between the arbitrary time origin of the query and the beginning of the reference track) whereas a set of chance, or incorrect, matches gives a random spread of query-to-reference time skews. Thus, the acoustic fingerprinting algorithm 204 can identify noisy recordings, even from a very large database of reference items.

In some embodiments of the disclosed subject matter, an audio synchronizing system can be installed on a mobile device (e.g., a smartphone). The audio synchronizing system can connect to remote resources (e.g., data storage and servers) to send and receive data (e.g., audio files and/or their acoustic fingerprints). In some embodiments, the mobile device can connect to a remote resource via a high-speed connection (e.g., WIFI or cellular) to download data to the mobile device. The audio synchronizing system can also operate in a connectionless state. In other words, in some situations, the audio synchronizing system does not require a constant network connection. Once the required data is uploaded or downloaded, the audio synchronizing system can operate offline.

In some embodiments of the disclosed subject matter, the audio synchronizing system can contain a data access management component, such as a Digital Rights Management (DRM) system. The audio synchronizing system can support purchase and download of data files (e.g., audio soundtracks) that can be subject to certain access restrictions or time limitations. A user of the audio synchronizing system can set up an account to authorize purchases and downloads.

In some embodiments of the disclosed subject matter, the audio synchronizing system can support encryption/decryption of the downloaded audio files for enhanced security. The downloaded data files can be encrypted and inaccessible without proper authorization, which can expire after a limited time period. Access can be granted through a password, which can be downloaded along with the data file or separately. Other mechanisms can also be utilized to ensure that the data files are only accessed by an authorized user, on an authorized device, and/or for an authorized period of time. The password can be time-sensitive. For example, the password can become invalid after a limited period of time. The password can be file-specific, device-specific, or both. The password can be pre-generated for the data file or can be generated on the fly when a purchase/download is requested. The number of times a user can access a downloaded file can also be limited. For example, a downloaded file can be configured to expire after it has been accessed a certain number of times. In one example, a downloaded file can be single-use, e.g., its access is terminated after it has been used once (e.g., the audio has been played once). Optionally, the audio synchronizing system can delete the downloaded data file when its access is terminated.

In some embodiments of the disclosed subject matter, the audio synchronizing system can have access to a mobile device's microphone and can have the ability to: record audio data, analyze it using an acoustic fingerprinting algorithm and generate fingerprint fragments. In some embodiments, the system can delete any already-analyzed recorded audio data. It can compile the fingerprint fragments while making individual fragments accessible, and compare the generated fingerprint fragment(s) with a reference acoustic fingerprint embedded in an active audio file (described in detail later). The audio synchronizing system can perform the above steps sequentially or simultaneously.

Figure 3:
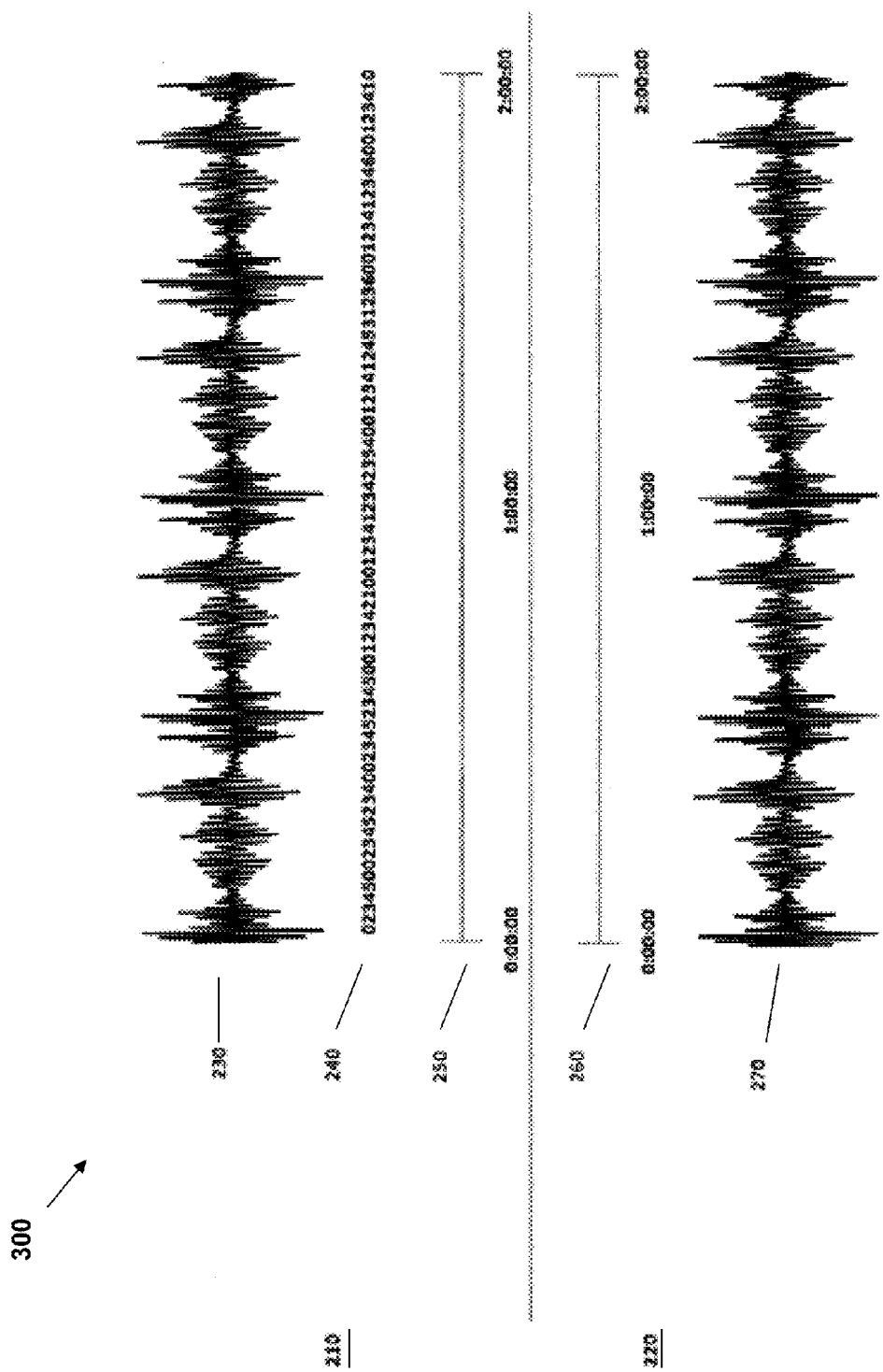
FIG. 3 illustrates examples of a reference audio file and an active audio file according to an embodiment of the disclosed subject matter.

FIG. 3 illustrates examples of a reference audio file and an active audio file according to an embodiment of the disclosed subject matter. In FIG. 3, the top half represents a "reference audio" file 210; the bottom half represents an "active audio" file 220. In the context of an audio synchronizing system for movie films in theaters, for example, the reference audio file can be soundtrack data for a movie being shown in a theater; the active audio file can be a purchased audio file (e.g., a foreign language audio file) for the movie. A digital audio wave 230 of the reference audio file 210 can be fed into an acoustic fingerprinting algorithm to generate its acoustic fingerprint 240, a "reference fingerprint." In some embodiments, the reference fingerprint can be pre-generated from the reference audio file for later uses. The reference fingerprint can contain multiple fragments. Each of these fragments can contain one or more timestamps 250. A fragment can be time-stamped at its beginning and end. A specific time period can be associated with a fragment, which can correspond to a specific section of the reference audio file. Although timestamp 250 spans two hours and covers only eight discrete fingerprint fragments, timestamps can span a longer or shorter period of time and contain more or fewer fingerprint fragments.

The active audio file 220 can contain the actual audio waveform data 270 that a user of the audio synchronizing system desires to hear. The active audio file 220 can be large, depending on the amount and/or quality of the audio data. The reference acoustic fingerprint 240, which can be pre-generated from the reference audio file 210, can be downloaded (e.g., to a mobile device) separately or as part of the active audio file 220. Since an acoustic fingerprint of an audio file is generally much smaller than the audio file itself, the data size increase caused by embedding the reference fingerprint in the active audio file 220 can be small. In some situations, only a portion of the reference fingerprint 240 is associated or embedded within the active audio file 220. The active audio file 220 can also contain timestamps 260. In some examples, the active audio file 220 can be time-stamped down to the hundredth of a second.

The reference audio file 210 and the active audio file 220 can have the same duration. The audio heard in the theater (e.g., the reference audio file), can occur at a timestamp that is identical to the timestamp in the active audio file where the same audio plays. If these timestamps do not match precisely, adjustments can be made to ensure that sequences are synchronized. In one example, five seconds can be added to the timestamps if the reference audio file is actually 5 seconds longer than the active audio file.

Figure 4:
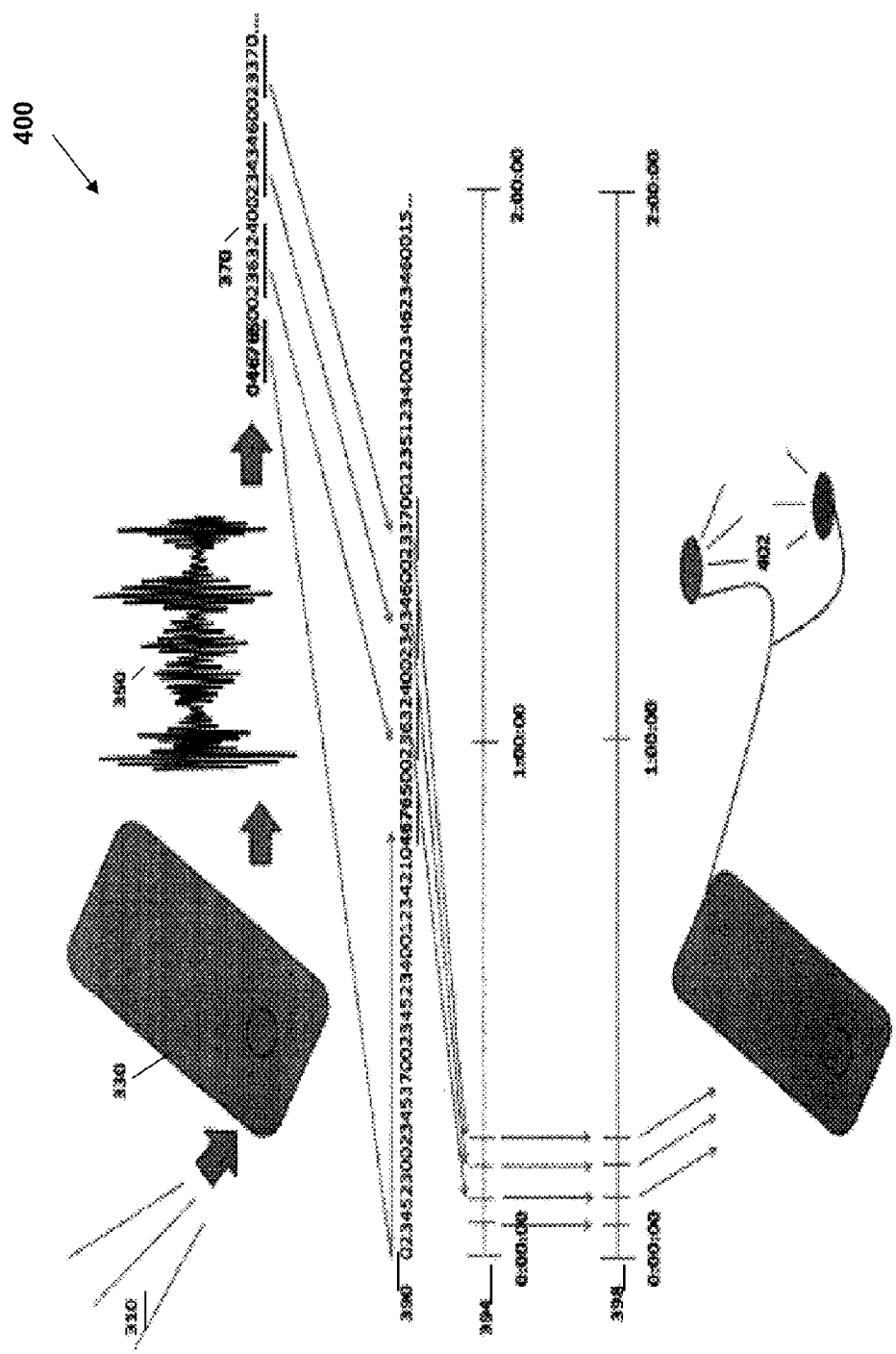
FIG. 4 illustrates an exemplary process of audio synchronizing according to an embodiment of the disclosed subject matter.

FIG. 4 illustrates an exemplary process 400 of audio synchronizing according to an embodiment of the disclosed subject matter. An audio synchronizing system receives sound 310 at the microphone of a mobile device 330. The audio synchronizing system records the sound and digitizes it into audio waveform fragments 350, which can be temporarily stored on the mobile device 330. The recorded sound can be given timestamps or a timeline from the initiation of recording, which can be used later to trigger the active audio file. The audio synchronizing system analyzes the recorded audio fragments 350 and generates acoustic fingerprint fragments 370 for the recorded audio fragments 350. The generation of acoustic fingerprint fragments can occur while audio fragments are being recorded. In some embodiments, once an acoustic fingerprint fragment is generated for an audio fragment, the temporarily recorded audio fragment can be discarded.

Once at least an initial fingerprint fragment 370 is generated, the audio synchronizing system scans a reference acoustic fingerprint 390, sometimes starting at the beginning, to identify a match. The reference acoustic fingerprint 390 can be pre-generated from a reference audio file and downloaded onto the mobile device with the active audio file. An individual fingerprint fragment can be used to identify a match. Alternatively, a group of consecutive or nonconsecutive fingerprint fragments 370 can be conjoined together and used to identify a match against the reference acoustic fingerprint 390. Once a match is identified for the first fingerprint fragment of the group, the audio synchronizing system can continue searching the reference acoustic fingerprint 390 at the position following the initial match until the group of fingerprint fragments can be matched against the reference acoustic fingerprint 390. In some embodiments, the mechanism described here can be implemented in hardware and/or software on a fingerprint matcher (e.g., 130 in FIG. 1) and/or other modules of a media synchronization system (e.g., 100 in FIG. 1).

The reference acoustic fingerprint 390 can contain timestamps or a timeline 394. An active audio file can also contain timestamps or a timeline 398. The two sets of timestamps or timelines 394 and 398 can have identical time sequences. Once the recorded fingerprint fragments 370 are matched to a specific portion of the reference acoustic fingerprint 390, the associated timestamps 394 are retrieved and linked to the timestamps 398 in the active audio file. When a recorded fingerprint fragment is matched with a specific fragment of the reference acoustic fingerprint 390, the timestamp of the match fragment (i.e., the most recently matched fingerprint fragment or "MRMF") at the reference acoustic fingerprint 390 can be logged. When a group of recorded fingerprint fragments are matched with a specific section of the reference acoustic fingerprint 390, the timestamp of the MRMF at the reference acoustic fingerprint 390 can be logged. Once the timestamp of the MRMF is determined, the audio synchronizing system can trigger the active audio file at the same timestamp, synchronizing the active audio file with the sound 310.

In some situations, even if a MRMF is successfully identified, a processing delay can cause the active audio file to lag behind the sound 310, which can keep progressing during the processing delay of the audio synchronizing system. For example: if the processing takes 200 ms from the point of time when the microphone picks up the sound 310 which corresponds to the MRMF to the point of time when the active audio file is triggered at the timestamp corresponding to the MRMF, the active audio file can be played 200 ms behind the sound 310.

The audio synchronizing system can preferably calculate and compensate for the processing delay in each synchronization session. In some embodiments, the audio synchronizing system can log the clocktime at the point of time when just enough sound 310 is captured to identify the MRMF. Based on the clocktime when the last bit of sound 310 is captured to identify the MRMF, the timestamp corresponding to the MRMF in the reference acoustic fingerprint, and the clocktime when the processing finishes (e.g., when the active audio file is just about to be triggered based on the determined timestamp), the audio synchronizing system can calculate the exact timestamp at which the active audio file should be triggered in order to match the progressing sound 310. One example scenario is described below: at clocktime 14:00:00.00 the microphone picks up just enough audio data to identify the MRMF; the MRMF corresponds to an end timestamp of 00:05:00.00 in the reference acoustic fingerprint (and the active audio file); at clocktime 14:00:00.20 the processing finishes (e.g., the active audio file is about to be triggered.). In this exemplary scenario, the processing delay is 0.2 s (14:00:00.20−14:00:00.00). With this knowledge, the audio synchronizing system can trigger the active audio file using a delay-compensated timestamp (00:05:00.00+0.2 s) at clock time 14:00:00.20. With the processing delay compensation, the active audio file can be synchronized to the progressing sound 310. The active audio file can be played through the mobile device's earphones 402.

In some embodiments, the processing delay can be preset to a default value and used for all future synchronization sessions. The default value can be universal or depend on the hardware/software configuration of the mobile device. In some other embodiments, the processing delay can be determined based on previous synchronization sessions (e.g., the average processing delay in the last ten synchronization sessions). When a processing delay is pre-determined, the audio synchronization system can skip logging clocktimes, and simply add the pre-determined processing delay to the ending timestamp of the MRMF then trigger the active audio file at the delay-compensated timestamp.

In some embodiments, the audio synchronizing system can identify the exact time skew between the audio query (which is now being captured in real time) and the reference item. The live audio input can generate, e.g., 50 hashes per second. The audio synchronizing system can look up each of these in its index, which now might contain only the hashes from the single soundtrack the application expects, or might contain a few soundtracks. The audio synchronizing system can perform the same process of calculating, for each distinct reference item, a histogram of the time skews between the timestamps of the hashes from the active audio, and the times at which those hashes occurred in the reference audio. Once a clear mode appears in that histogram, the audio synchronizing system can provide the time difference between local time reference (the "zero" against which it calculates the times of the local query hashes), and the beginning of the reference sound track.

This time difference can then allow the audio synchronizing system to calculate the appropriate point in the replacement soundtrack to initiate playback. In one example, the absolute times are quantized in units of 22.6 ms, which is the resolution to which the replacement soundtrack can be synchronized, and is well within the range that is perceived as "synchronized" by users. This value can be chosen to match usual audio recognition application scenarios where a user needs to store a very large number of reference items; the acoustic fingerprinting algorithm can be modified for finer resolution if it turns out to give an improved experience. In some embodiments, the mechanism described here can be implemented in hardware and/or software on an active media manager (e.g., 140 in FIG. 1) and/or other modules of a media synchronization system (e.g., 100 in FIG. 1).

Figure 5:
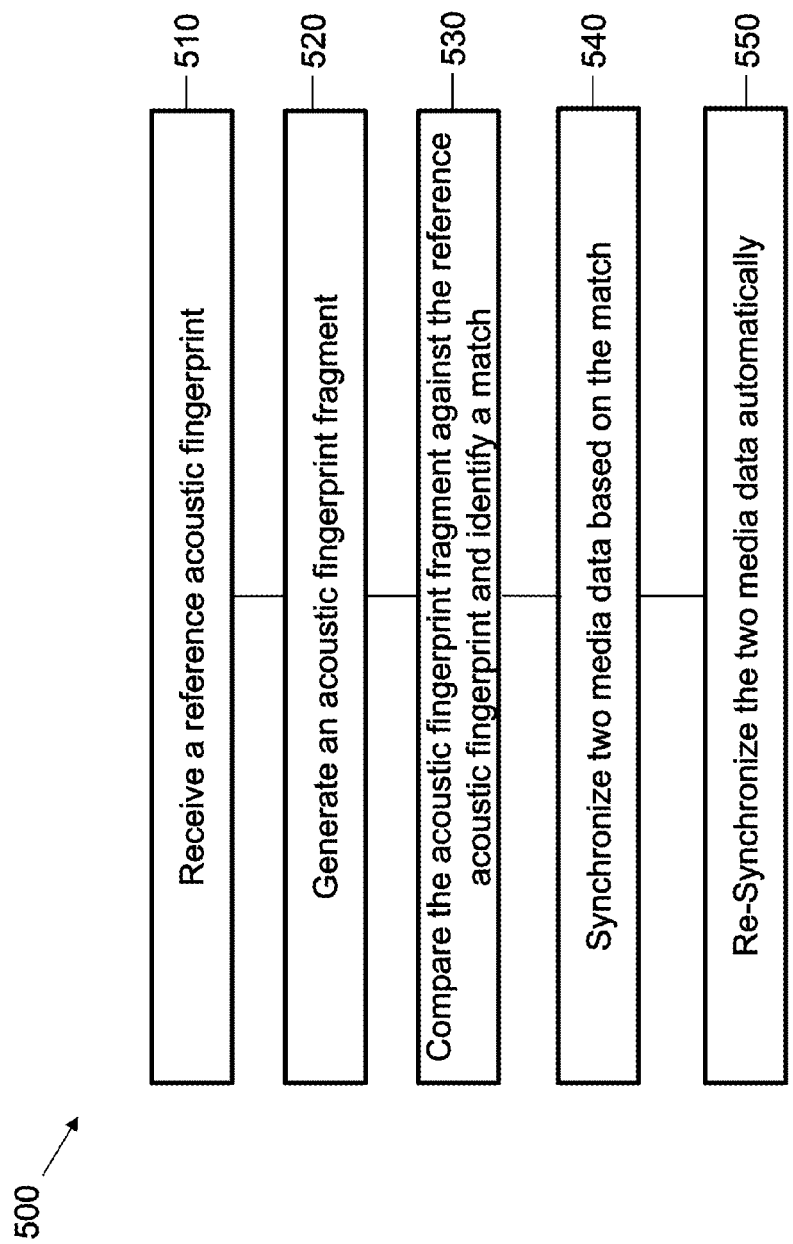
FIG. 5 illustrates an exemplary process of synchronizing media data according to certain embodiments of the disclosed subject matter.

FIG. 5 illustrates an exemplary process 500 of synchronizing media data according to certain embodiments of the disclosed subject matter. The process 500 can be modified by, for example, having steps rearranged, changed, added, and/or removed.

At step 510, a reference acoustic fingerprint is received. In some embodiments, a reference fingerprint manager (e.g., 110 in FIG. 1) can receive, store, and manage the reference acoustic fingerprint for a first media data.

At step 520, an acoustic fingerprint fragment is generated. In some embodiments, a fingerprint calculator (e.g., 120 in FIG. 1) can generate at least one acoustic fingerprint fragment from a portion or the entirety of the first media data. In some embodiments, a fingerprint calculator (e.g., 120 in FIG. 1) can generate at least one acoustic fingerprint fragment from one or more frequency bands of a portion or the entirety of the first media data. Optionally, a fingerprint calculator (e.g., 120 in FIG. 1) can also generate at least one hash from one of the frequency bands.

At step 530, the acoustic fingerprint fragment is compared against the reference acoustic fingerprint. In some embodiments, a fingerprint matcher (e.g., 130 in FIG. 1) can identify a match based on the comparison. In some embodiments, a fingerprint matcher (e.g., 130 in FIG. 1) can locate a timestamp corresponding to the reference acoustic fingerprint.

At step 540, the two media data are synchronized based on the identified match. In some embodiments, an active media manager (e.g., 140 in FIG. 1) can trigger the second media data based on the timestamp. Optionally, an active media manager (e.g., 140 in FIG. 1) can calculate and compensate a synchronization processing delay.

At step 550, the two media data are re-synchronized automatically. In some embodiments, re-synchronization can eliminate or reduce time drift between the two media data. In some embodiments, a time drift can be detected and used to trigger the re-synchronization. A re-synchronizer (e.g., 180 in FIG. 1) can initiate re-synchronization periodically, on demand, or upon reaching certain thresholds. In some embodiments, a re-synchronizer (e.g., 180 in FIG. 1) can adjust the playback position and/or the playback speed of the second media data. More details about re-synchronization can be found in later sections of this document, including FIGS. 6 and 7 and their corresponding descriptions.

Optionally, the process 500 can include one or more additional steps not shown in FIG. 5. These additional steps can include receiving media data (e.g., the second media data) from a remote source, verifying security access to the second media data, and decrypting the second media data.

Small differences in playback speed, e.g. one part in 1,000, may not affect the fingerprint matching (which may be only sensitive to gross timing changes of one percent or more), but can lead to noticeable drift in synchronization over the length of a movie (e.g., 100 ms drift, which is about the perceptibly-tolerable limit, after only 100 seconds of audio), so it may be insufficient to synchronize once and then simply play the replacement audio. Instead, the fingerprint matching can be repeated periodically, and the playback position (and perhaps speed) can be adjusted to keep the replacement soundtrack in sync throughout the movie.

Battery conservation can be a concern for running synchronization frequently, but an exemplary strategy where the fingerprinting is run at a high frequency for the first minute or so, to estimate a high-resolution speed trim that ought to keep the soundtracks perfectly in sync, then rechecked every minute or so thereafter to ensure or accommodate any further drift in relative speed, can greatly reduce processing load and conserve energy.

In some embodiments, resynchronization can preferably run when playing an audio file (e.g., active audio) in sync with external audio (e.g., reference audio) for an extended period of time. The active audio is meant to play at the same timestamp as the reference audio. The reference audio and its playback speed are normally not altered. The active audio, is normally controlled by a device capable of computing the location of the reference audio, such as a mobile device. Even if the reference audio and active audio are the same length, in terms of time, small fluctuations in playback speed of the reference or active audio can accumulate to a noticeable difference between the position of the active audio and the reference audio, even when started at the same position.

In order to account for this drift, periodic resynchronizations can be executed to realign the active audio position to the reference audio position. Small fluctuations in reference audio playback speed can affect its pitch. Large deviations in playback speed can affect the perceived pitch and can also affect the synchronization. A position-locating and audio triggering algorithm used to synchronize the two audio files can account for this issue. One approach is to have resynchronization occur periodically at specified intervals. A timer can be used to trigger synchronization after a specified amount of time. Another method would be to trigger resynchronizations at positions in the reference audio known to have high probabilities of fluctuation. An example of a high probability of fluctuation position is when a projectionist changes movie reels, if the reference audio is the audio coming through speakers at a theater which requires reel changing. A combination of timed interval resynchronizations and specified resynchronization points can be used as a solution to the drift problem as well.

Figure 6:
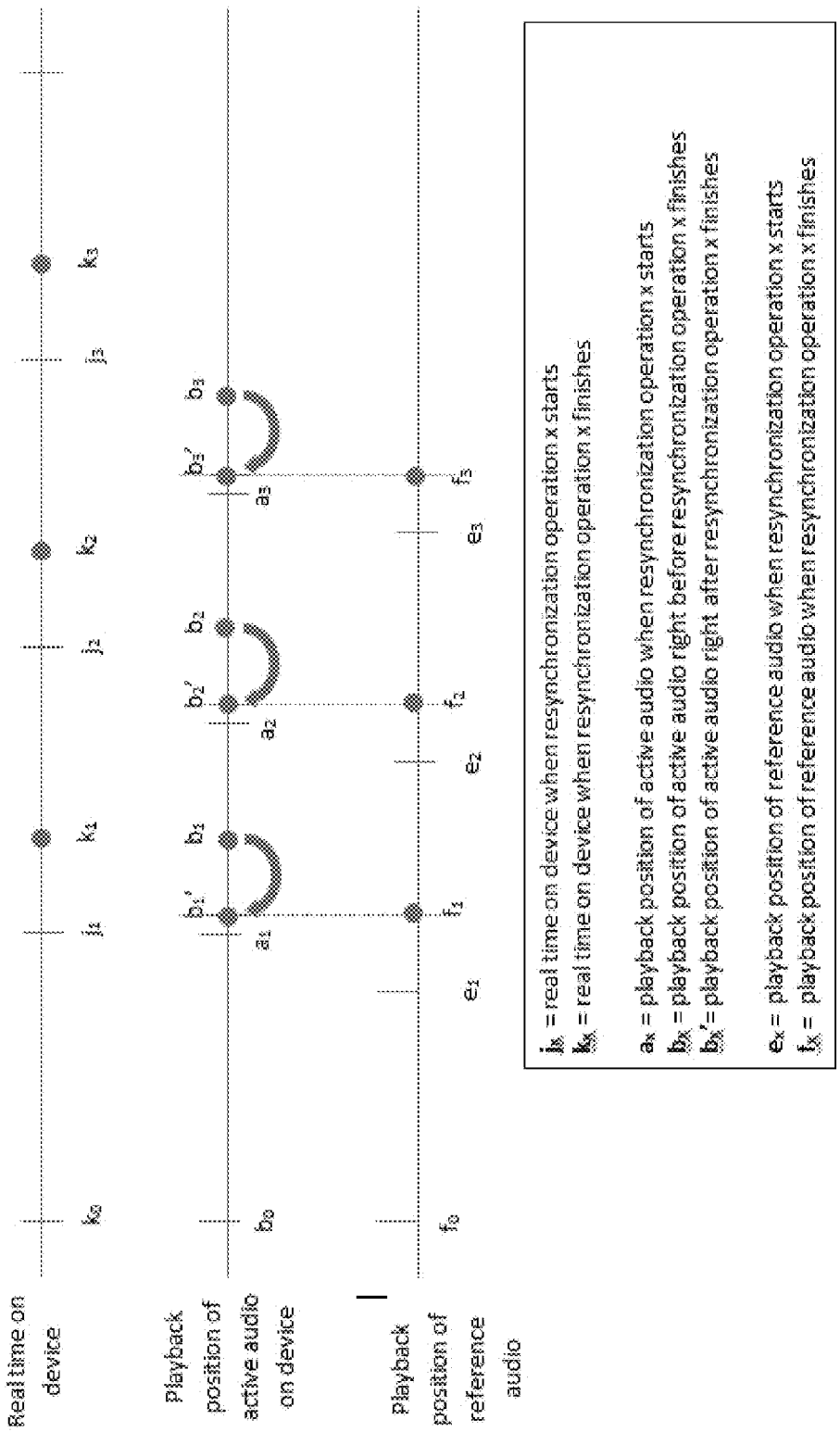
FIG. 6 illustrates one embodiment of re-synchronizing an active audio file to a reference audio file.

FIG. 6 illustrates one embodiment of re-synchronizing an active audio file to a reference audio file. This example illustrates the action of periodically timed resynchronization, but periodic synchronization applies to resynchronization at non-equal intervals as well. In this example, the reference audio is constantly playing at a slightly slower rate than is expected. This approach also works when the reference audio is playing at faster playback speeds than expected, as well as a non-constant playback speed deviation.

Referring to FIG. 6, the controlled audio on a device (e.g., the active audio) and the external audio (e.g., the reference audio) are initially aligned at time $k_0$ at positions $b_0$, and $f_0$, respectively. As real time progresses, the active audio gets ahead of the reference audio, due to the deviation in playback speeds. At time $j_1$, a resynchronization is initiated. The difference between the active and reference audio is represented by the difference in position of $a_1$ and $e_1$. As is evident from FIG. 6, the active audio is ahead of the reference audio at time $j_1$. At the time of the end of the resynchronization, $k_1$, the active audio is at location $b_1'$ and the reference audio is located at $f_1$. The two audio streams are now in sync. $k_1$ is the time at which the position of the active audio file is moved so as to be synchronized with the position of the reference audio file. The trigger point, $k_1$, takes account of the duration of the synchronization procedure and the lag between triggering audio and playing audio when performing the synchronization process. It is at the trigger point where the active audio jumps from location $b_1$ to $b_1'$. It can be seen that $b_1'$ is aligned with $f_1$, the location of the reference audio at the end of the resynchronization process.

The jump from $b_1$ to $b_1'$ can be perceived as a skip in the audio. If done in small enough intervals, this skip can be imperceptible. This resynchronization process can reoccur at timed intervals to keep the active audio aligned with the reference audio. The difference in time between $k_3$ and $f_3$ exemplifies the difference between the active audio and reference audio without the resynchronization process. The difference in time between $a_2$ and $j_2$ should be the same as the difference between $b_1'$ and $b_1$, since the real time on the device is unaltered and the jump from $b_1$ to $b_1'$ in the active audio causes $a_2$ to fall behind $j_2$. Similarly, the difference between $a_3$ and j3 should be the same as the sum of the differences between $b_1'$ and $b_1$ and between $b_2'$ and $b_2$, since the real time on the device is unaltered and the two jumps from $b_1$ to $b_1'$ and from $b_2$ to $b_2'$ in the active audio cause $a_3$ to fall even further behind $j_3$.

In some embodiments, re-synchronization mechanisms such as the algorithm described corresponding to FIG. 6 can be implemented in hardware and/or software on a re-synchronizer (e.g., 180 in FIG. 1) and/or other modules of a media synchronization system (e.g., 100 in FIG. 1).

Another approach to the drift problem is to alter the playback speed of the active audio to align with the playback speed of the external audio. This can be done in conjunction with periodic resynchronizations. A logic test can be used to see if there is a constant deviation in playback speed, or random fluctuations. If the speed deviation between audio files is found to be constant and the active audio playback speed is altered, this could lead to a decreased need for resynchronizations because the cause of drift has been reduced.

Figure 7:
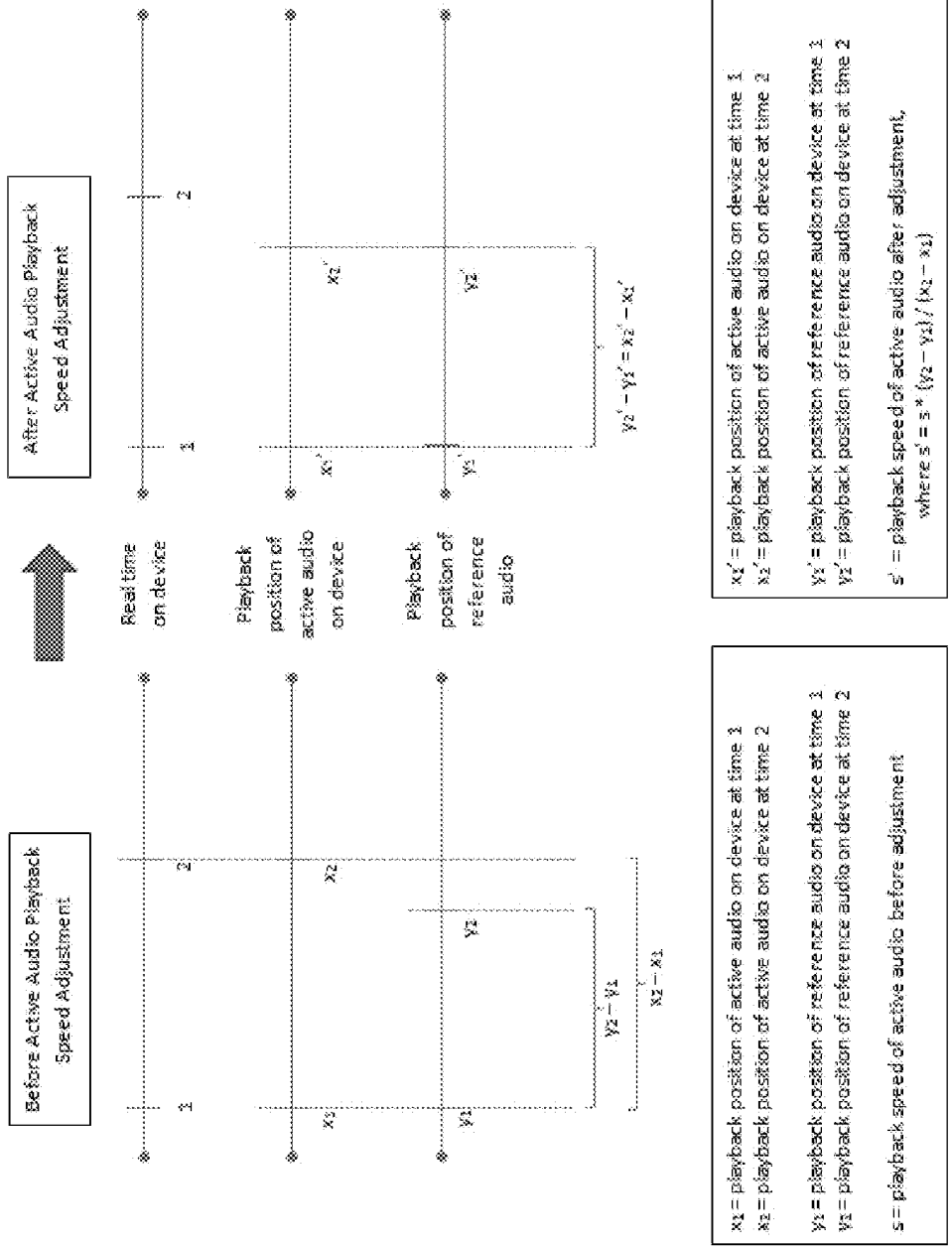
FIG. 7 illustrates another embodiment of re-synchronizing an active audio file to a reference audio file.

FIG. 7 illustrates an example of altering the active audio playback speed. In this example, the constant deviation in playback speed can cause the reference audio to be played at a slower rate than the active audio. This solution can also work if the external audio is being played at a faster rate than the active audio.

Referring to FIG. 7, at time 1 and 2 before the playback speed adjustment, the active audio positions and the back calculated reference audio positions can be logged. The reference audio positions are back calculated since they are not readily available and have to be calculated by sampling and analyzing as described earlier in this document. The difference of audio location in the reference audio can be back calculated from the position-locating portion of the resynchronization process, or a position-locating procedure previously described. The active audio can be playing at a playback speed of s. The difference in active audio location and reference audio location from time 1 to time 2 is measured by the device. The differences can be seen in $x_1$ and $x_2$ and by $y_1$ and $y_2$.

The difference between $(x_2-x_1)$ and $(y_2-y_1)$ can be used to calculate the needed adjustment in playback speed. Several measurements can be used to find an average value, given that the interval between times 1 and 2 is constant. Once an average value is found, the playback speed of the active audio can be multiplied by a ratio of difference in the reference audio position $(y_2-y_1)$ to a difference in the active audio position $(x_2-x_1)$ from time 1 to 2. It can be seen that after the active audio playback speed adjustment, the position of both audio tracks is aligned and the two audio files are in sync.

In some embodiments, re-synchronization mechanisms such as the algorithm described corresponding to FIG. 7 can also be implemented in hardware and/or software on a re-synchronizer (e.g., 180 in FIG. 1) and/or other modules of a media synchronization system (e.g., 100 in FIG. 1).

Figure 8:
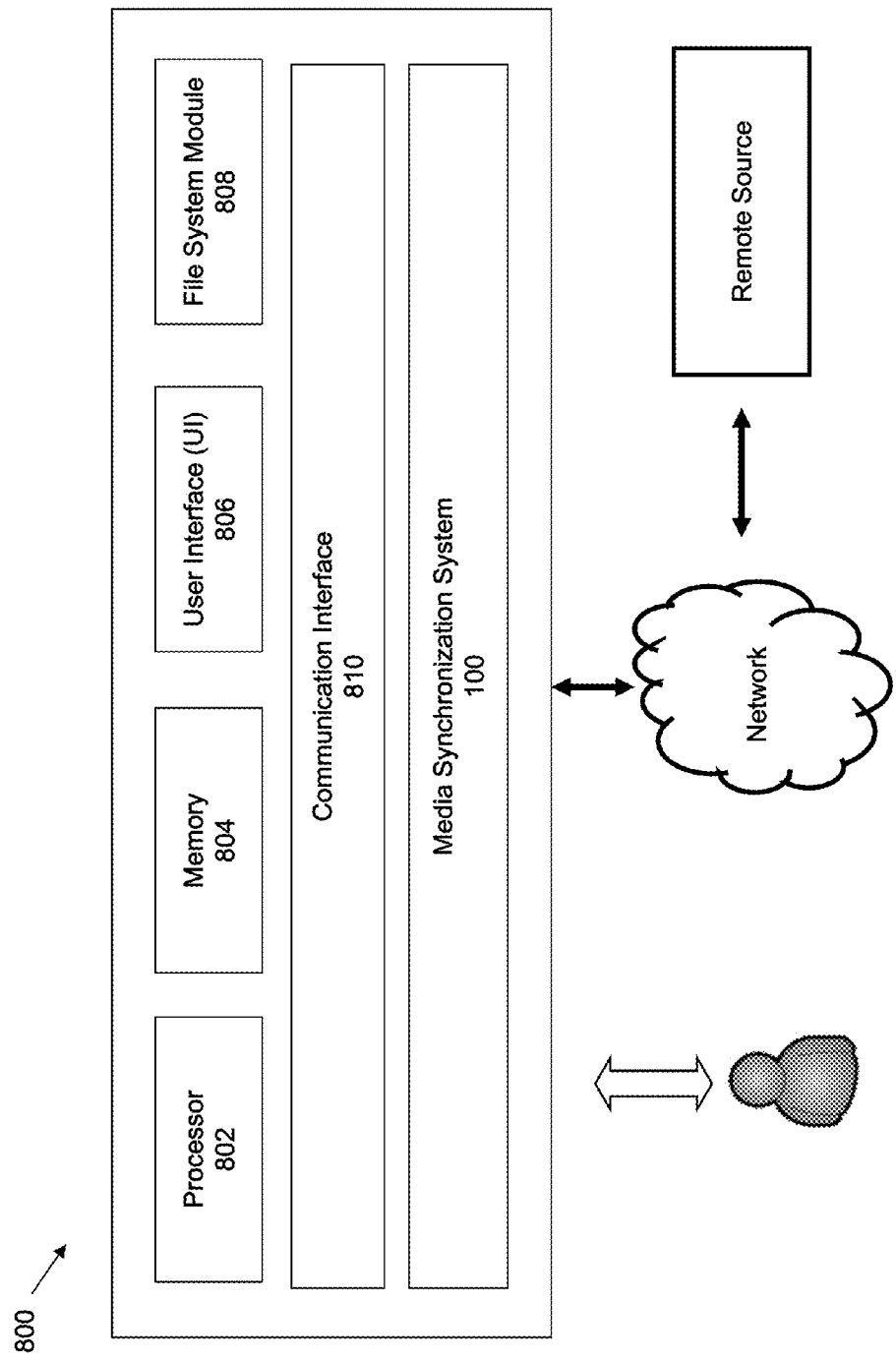
FIG. 8 illustrates a block diagram of an exemplary hosting device.

FIG. 8 illustrates a block diagram of an exemplary hosting device 800 according to certain embodiments of the disclosed subject matter. The hosting device 800 can include at least one processor 802 and at least one memory 804. The processor 802 can be hardware that is configured to execute computer readable instructions such as software. The processor 802 can be a general processor or be application specific hardware (e.g., an application specific integrated circuit (ASIC), programmable logic array (PLA), field programmable gate array (FPGA), or any other integrated circuit). The processor 802 can execute computer instructions or computer code to perform desired tasks. The memory 804 can be a transitory or non-transitory computer readable medium, such as flash memory, a magnetic disk drive, an optical drive, a programmable read-only memory (PROM), a read-only memory (ROM), a random access memory (RAM), or any other memory or combination of memories.

The hosting device 800 can also optionally include a user interface (UI) 806, a file system module 808, and a communication interface 810. The UI 806 can provide an interface for users to interact with the hosting device 800, for example, audio capturing device (e.g., microphone), image/video capturing device (e.g., camera), audio playback device (e.g., speaker), image/video playback device (e.g., screen). A user can access the media synchronization system 100 through the UI 806 of the hosting device 800. The file system module 808 can be configured to maintain a list of all data files, including both local data files and remote data files, in every folder in a file system. The file system module 808 can be further configured to coordinate with the memory 804 to store and cache files/data. The hosting device 800 can also include a media synchronization system 100. The description of the media synchronization system 100 and its functionalities can be found in the discussion of FIGS. 1-7. The communication interface 810 can allow media synchronization system 100 to communicate with external resources (e.g., a network or a remote client/server). The host device 800 can include additional modules, fewer modules, or any other suitable combination of modules that perform any suitable operation or combination of operations. In some embodiments, a user can interact with the host device 800. In some embodiments, the host device 800 can access a remote source via a network.

While the foregoing description has primarily been described in the context of mobile devices and mobile applications, the present disclosure can also be used with wired computing systems and applications. In addition, while the foregoing description has primarily been described in the context of synchronizing audio for movie films, the present disclosure can also be used in any other contexts that would benefit by synchronizing audio/video with other multimedia content.

Although the disclosed subject matter has been described and illustrated in the foregoing exemplary embodiments, it is understood by those skilled in the art that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or other factor(s).

What is claimed is:

1. A method of synchronizing media data, comprising:
   receiving a reference acoustic fingerprint for a first media data, the reference acoustic fingerprint comprising:
   a plurality of reference acoustic fingerprint fragments, each reference acoustic fingerprint fragment comprising a hash generated based on one of a plurality of individual audio fragments, each individual audio fragment comprising a portion of the first media data that is associated with an acoustic event in the first media data; and a timeline comprising a plurality of timestamps, wherein at least one timestamp from the plurality of timestamps is associated with each of the plurality of reference acoustic fingerprint fragments;

generating at least one acoustic fingerprint fragment from a portion of the first media data recorded during a playback of the first media data, the at least one acoustic fingerprint fragment comprising a hash, comprising:

calculating a time difference between a first timestamp of a first onset and a second timestamp of a second onset, wherein:

the first and second onsets are in the portion of the first media data recorded during the playback; and each of the first and second onsets comprise a time at which an energy in the frequency band suddenly increases above a recent average level; and hashing the time difference to generate the hash;

comparing the hash of the at least one acoustic fingerprint fragment against the reference acoustic fingerprint and identifying a match with the hash of one of the plurality of reference acoustic fingerprint fragments in the reference acoustic fingerprint;

receiving a second media data, comprising a second timeline comprising a second plurality of timestamps with a same time sequence as the timeline of the reference acoustic fingerprint; and synchronizing the second media data with the first media data based on the match, comprising matching a timestamp associated with the matching one of the plurality of reference acoustic fingerprint fragments with a timestamp in the second timeline.

2. The method of claim 1, further comprising receiving the second media data from a remote source.

3. The method of claim 2, wherein the reference acoustic fingerprint is embedded within the second media data.

4. The method of claim 2, further comprising verifying security access to the second media data.

5. The method of claim 2, further comprising decrypting the second media data.

6. The method of claim 1, wherein the second media data contains audio and video information.

7. The method of claim 1, further comprising generating the at least one fingerprint fragment from one of a plurality of frequency bands of the portion of the first media data.

8. The method of claim 1, further comprising generating at least one hash from one of a plurality of frequency bands of the portion of the first media data.

9. The method of claim 1, wherein the identifying step comprises locating a timestamp corresponding to the reference acoustic fingerprint.

10. The method of claim 9, wherein the synchronizing step comprises triggering the second media data based on the timestamp.

11. The method of claim 1, wherein the synchronizing step comprises calculating a synchronization processing delay.

12. The method of claim 1, wherein the synchronizing step comprises compensating a synchronization processing delay.

13. The method of claim 1, further comprising:

receiving a newly recorded portion of media data associated with the first media data recorded after the portion of the first media data;

generating a second acoustic fingerprint fragment from the newly recorded portion of media data, the second acoustic fingerprint comprising a second hash;

comparing the second hash of the second acoustic fingerprint fragment against the reference acoustic fingerprint and identifying a second match with a second one of the plurality of reference acoustic fingerprint fragments in the reference acoustic fingerprint; and detecting a time drift between the first and second media data based on the one or more timestamps associated with the matching second one of the plurality of reference acoustic fingerprint fragments and a timestamp from the second timeline associated with a current playback position of the second media data.

14. The method of claim 1, further comprising re-synchronizing the second media data with the first media data automatically.

15. The method of claim 14, wherein the re-synchronizing step comprises adjusting a playback position of the second media data.

16. The method of claim 14, wherein the re-synchronizing step comprises adjusting a playback speed of the second media data.

17. The method of claim 1, wherein generating the hash comprises:

hashing the time difference to generate twelve bits of quantization for the time difference; and hashing a frequency band associated with the first and second onsets to generate three bits for quantizing the frequency band.

18. A method of synchronizing media data, comprising:

capturing a portion of a first media data;

generating at least one acoustic fingerprint fragment from the portion of the first media data, the at least one acoustic fingerprint fragment comprising a hash, comprising:

calculating a time difference between a first timestamp of a first onset and a second timestamp of a second onset, wherein:

the first and second onsets are in the portion of the first media data recorded during the playback; and each of the first and second onsets comprise a time at which an energy in the frequency band suddenly increases above a recent average level; and hashing the time difference to generate the hash;

receiving a second media data, wherein a reference acoustic fingerprint for the first media data is embedded within the second media data, the reference acoustic fingerprint comprising:

a plurality of reference acoustic fingerprint fragments, each reference acoustic fingerprint fragment comprising a hash generated based on one of a plurality of individual audio fragments, each individual audio fragment comprising a portion of the second media data that is associated with an acoustic event in the second media data; and a timeline comprising a plurality of timestamps, wherein at least one timestamp from the plurality of timestamps is associated with each of the plurality of reference acoustic fingerprint fragments;

comparing the hash of the at least one acoustic fingerprint fragment against the reference acoustic fingerprint and identifying a timestamp corresponding to a hash of one of the reference acoustic fingerprint fragments in the reference acoustic fingerprint that matches the hash of the at least one acoustic fingerprint fragment;

triggering the second media data based on the timestamp to synchronize the second media data with the first media data; and re-synchronizing the second media data with the first media data automatically, comprising:

capturing a new portion of media data associated with the first media data;

generating a second acoustic fingerprint fragment from the newly recorded portion of media data, the second acoustic fingerprint comprising a second hash;

comparing the second hash of the second acoustic fingerprint fragment against the reference acoustic fingerprint and identifying a second match with a second one of the plurality of reference acoustic fingerprint fragments in the reference acoustic fingerprint; and detecting a time drift between the first and second media data based on the one or more timestamps associated with the matching second one of the plurality of reference acoustic fingerprint fragments and a timestamp from the timeline associated with a current playback position of the second media data.

19. The method of claim 18, further comprising receiving the second media data from a remote resource.

20. The method of claim 18, wherein the re-synchronizing step comprises adjusting a playback position of the second media data.

21. The method of claim 18, wherein the re-synchronizing step comprises adjusting a playback speed of the second media data.

22. A computerized system for synchronizing media data, comprising a processor configured to:

receive a reference acoustic fingerprint for a first media data, the reference acoustic fingerprint comprising:

a plurality of reference acoustic fingerprint fragments, each reference acoustic fingerprint fragment comprising a hash generated based on one of a plurality of individual audio fragments, each individual audio fragment comprising a portion of the first media data that is associated with an acoustic event in the first media data; and a timeline comprising a plurality of timestamps, wherein at least one timestamp from the plurality of timestamps is associated with each of the plurality of reference acoustic fingerprint fragments;

generate at least one acoustic fingerprint fragment from a portion of the first media data recorded during a playback of the first media data, the at least one acoustic fingerprint comprising a hash, comprising:

calculating a time difference between a first timestamp of a first onset and a second timestamp of a second onset, wherein:

the first and second onsets are in the portion of the first media data recorded during the playback; and each of the first and second onsets comprise a time at which an energy in the frequency band suddenly increases above a recent average level; and hashing the time difference to generate the hash;

compare the hash of the at least one acoustic fingerprint fragment against the reference acoustic fingerprint and identify a match with the hash of one of the plurality of reference acoustic fingerprint fragments in the reference acoustic fingerprint;

receive a second media data, comprising a second timeline comprising a second plurality of timestamps with a same time sequence as the timeline of the reference acoustic fingerprint; and synchronize the second media data with the first media data based on the match, comprising matching a timestamp associated with the matching one of the plurality of reference acoustic fingerprint fragments with a timestamp in the second timeline.

23. The system of claim 22, wherein the processor is further configured to manage security access to the second media data.

24. The system of claim 22, wherein the processor is further configured to customize the system for synchronizing media data.

25. The system of claim 22, further comprising a network interface in communication with the processor, the network interface being configured to communicate with a remote source and download the second media data from the remote source.

26. The system of claim 22, wherein the processor is further configured to interact with a host device to receive the portion of the first media data.

27. The system of claim 22, wherein the processor is further configured to locate a timestamp corresponding to the reference acoustic fingerprint.

28. The system of claim 27, wherein the processor is further configured to trigger the second media data based on the timestamp.

29. The system of claim 22, wherein the processor is further configured to re-synchronize the second media data with the first media data automatically.

30. The system of claim 29, wherein the processor is further configured to adjust a playback position of the second media data.

31. The system of claim 29, wherein the processor is further configured to adjust a playback speed of the second media data.

\* \* \* \* \*